No. 853,847. PATENTED MAY 14, 1907.
J. S. VAN BUREN.
TILTING FRAME FOR COOKING STOVES.
APPLICATION FILED JAN. 10, 1907.
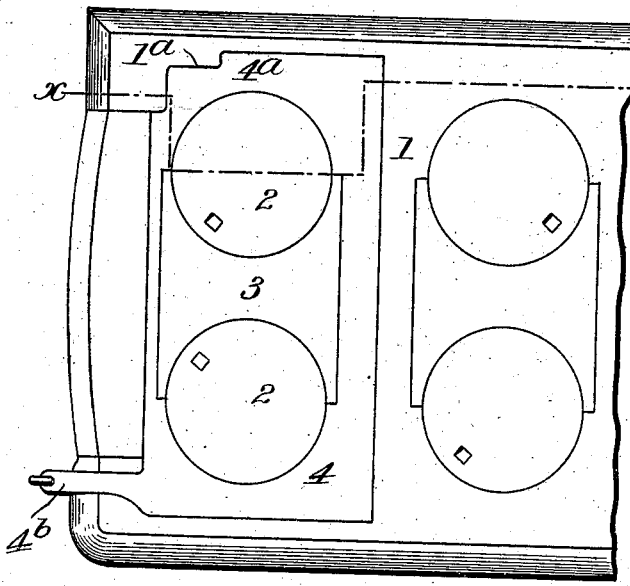
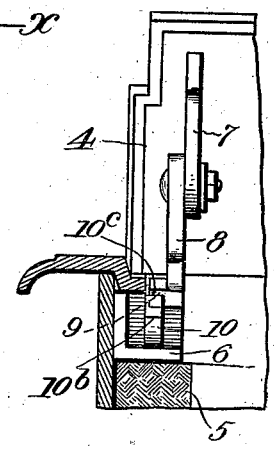
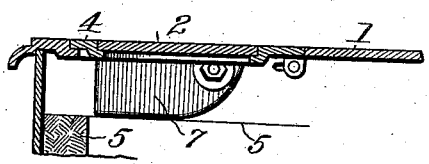
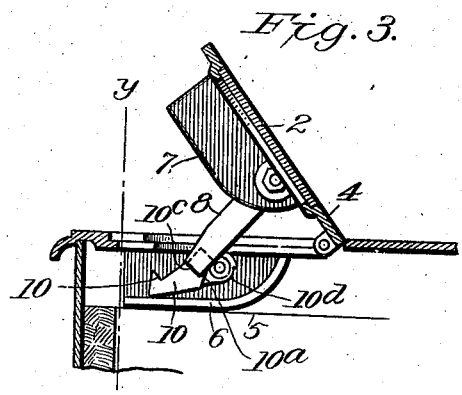
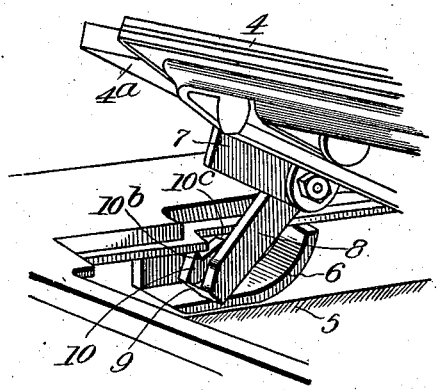
Witnesses
C. H. Walker.
F. J. Vehmeyer.
Inventor
Jasper S. Van Buren,
By Edson Bros,
Attorneys

UNITED STATES PATENT OFFICE.

JAFEW S. VAN BUREN, OF ALBANY, NEW YORK, ASSIGNOR TO RATHBONE, SARD & CO., OF ALBANY, NEW YORK, A CORPORATION OF NEW YORK.

TILTING FRAME FOR COOKING-STOVES.

No. 853,847.     Specification of Letters Patent.     Patented May 14, 1907.

Application filed January 10, 1907. Serial No. 351,694.

*To all whom it may concern:*

Be it known that I, JAFEW S. VAN BUREN, a citizen of the United States, residing at Albany, in the county of Albany and State of New York, have invented certain new and useful Improvements in Tilting Frames for Cooking-Stoves; and I do hereby declare the following to be a full, clear, and exact description of the invention, such as will enable others skilled in the art to which it appertains to make and use the same.

My invention relates to improvements in stoves and especially to a device for supporting a swinging section of the stove top, containing the two front lids, in a raised position.

The object of the invention is to provide a simple form of device adapted to support the tilting plate in two positions, a wide open position for putting on coal and a lower position particularly adapted for broiling or toasting.

The invention consists in the features of construction and combinations of parts hereinafter described and specified in the claims.

In the accompanying drawings, illustrating the preferred embodiment of my invention: Figure 1 is a plan view of the hinged or tilting plate, showing the same in connection with a portion of the top of an ordinary cooking stove. Fig. 2 is a broken sectional view on the line $x$—$x$ of Fig. 1. Fig. 3 is a sectional view of the hinged plate and a portion of the stove, showing said plate raised. Fig. 4 is a broken sectional view taken on the line $y$—$y$ of Fig. 3, and Fig. 5 is a perspective view of a portion of the stove showing the position of the support when the plate is partly lowered.

Referring more particularly to the drawings, 1 is the top of a cooking stove, the two front lids or covers 2 and the short center 3 of which are contained in the tilting plate 4. It will be noted that said plate has a projecting portion $4^a$ at one end thereof which fits a correspondingly shaped offset portion $1^a$ of the opening in the stove top. Said offset portion of said opening extends above the lining 5 of the fire pot and below it is arranged a boxing or casing 6 which is curved up at one end to meet the top of the stove.

Below the projecting portion $4^a$ of the hinged plate is arranged a rib 7 which is adapted to close the side of the casing 6 next to the fire pot when said plate is lowered. To the outer face of said rib and at the end thereof opposite the curved end of the casing, is pivoted a post 8 having a laterally projecting lug 9 at its end. In the casing is pivoted a ratchet 10, the free end of which extends away from the curved end of said casing and normally rests upon the bottom thereof. Said free end portion is laterally offset at $10^a$ toward the lug on the post. The end of said ratchet is stepped at $10^b$ and $10^c$ forming two teeth, either of which is adapted to be engaged by the lug on the post and thereby hold the hinged plate in a raised position. The other end of the offset portion $10^a$ is rounded as at $10^d$.

It will be seen that as the hinged plate is raised by the handle $4^b$, the lug on the post will ride up the end of the ratchet and drop into the first step and be supported by the first tooth. If the plate is raised still higher, said lug will engage the second tooth and thereby support said plate in a more open position. To close the plate, all that is necessary is to raise it a little farther until the lug on the post escapes the top of the lateral offset $10^a$, when the post will drop down upon the curved end of the casing and pass down said curved end and the bottom of said casing, said lug riding below the curved portion $10^d$ and raising the ratchet, until said post is folded in the casing and the plate is lowered into the plane of the top of the stove.

It will be observed that as the post and ratchet are both housed in the casing and said casing is arranged out of the line of the fire pot, it is impossible for any of the parts to warp or bind from action of the fire. My device is, therefore, both simple in construction and practically durable.

I claim

1. In a cooking stove, the combination, with a lifting plate having a rib on its lower surface, of a post pivoted to said rib, a ratchet below the top of the stove, for the purpose specified, and a casing adapted to be closed by said rib and to house said post and ratchet.

2. In a cooking stove, the combination, with a tilting plate, of a post pivoted to said plate and having a laterally projecting lug at its end, a ratchet pivoted below the top of the stove, for the purpose specified, said ratchet having a laterally offset portion provided with a tooth at one end and a rounded portion at the other end, and a casing adapted to house said post and ratchet, said casing having its bottom curved up at one end, the lug on said post adapted to ride up onto said tooth as the plate is raised and to escape the laterally offset portion of said ratchet as it is raised farther and engage the rounded portion of said pawl and raise the latter as said plate is lowered.

3. In a cooking stove, the combination, with a tilting plate, of a post pivoted to said plate and having a laterally projecting lug at its end, a ratchet pivoted below the top of the stove, for the purpose specified, said ratchet having a laterally offset portion provided with a tooth at one end and a rounded portion at the other end, and a casing adapted to house said post and ratchet, said casing having its bottom curved up at one end, the lug on said post adapted to ride up onto said tooth as the plate is raised and to pass over the pivoted ratchet and fall against the curved bottom of the ratchet case, compelling the post to assume a horizontal position and become housed within the case as the plate is lowered.

In testimony whereof, I affix my signature, in presence of two witnesses.

JAFEW S. VAN BUREN

Witnesses:
  A. I. HENNESSY,
  H. S. NELSON.